(12) United States Patent
Wenderott et al.

(10) Patent No.: US 9,488,421 B2
(45) Date of Patent: Nov. 8, 2016

(54) COOLANT SYSTEM FOR MACHINE TOOLS

(75) Inventors: Dirk Wenderott, Castrop-Rauxel (DE);
Andreas Kandzior, Neuenrade (DE);
Jens Holger Ulrich, Neuenrade (DE)

(73) Assignee: Brinkmann Pumpen K.H. Brinkmann GmbH & Co. KG, Werdohl (DE)

( * ) Notice: Subject to any disclaimer, the term of this patent is extended or adjusted under 35 U.S.C. 154(b) by 365 days.

(21) Appl. No.: 14/358,522

(22) PCT Filed: Aug. 21, 2012

(86) PCT No.: PCT/EP2012/066271
§ 371 (c)(1),
(2), (4) Date: May 15, 2014

(87) PCT Pub. No.: WO2013/079229
PCT Pub. Date: Jun. 6, 2013

(65) Prior Publication Data
US 2014/0262197 A1 Sep. 18, 2014

(30) Foreign Application Priority Data
Dec. 2, 2011 (DE) .................. 20 2011 052 170

(51) Int. Cl.
*F28F 27/00* (2006.01)
*B23Q 11/10* (2006.01)
*G05D 16/20* (2006.01)

(52) U.S. Cl.
CPC ............ *F28F 27/00* (2013.01); *B23Q 11/1038* (2013.01); *G05D 16/2066* (2013.01)

(58) Field of Classification Search
CPC  F28F 27/00; G05D 16/2066; B23Q 11/1038
See application file for complete search history.

(56) References Cited

U.S. PATENT DOCUMENTS

| | | | | |
|---|---|---|---|---|
| 5,297,657 A | * | 3/1994 | McConkey | B23Q 11/1038 184/27.1 |
| 5,522,707 A | * | 6/1996 | Potter | B23Q 11/1038 417/4 |
| 5,951,216 A | * | 9/1999 | Antoun | B23Q 11/1038 405/61 |
| 6,241,432 B1 | * | 6/2001 | Sasanecki | B23Q 11/1038 137/884 |
| 6,874,977 B2 | * | 4/2005 | Cook | B23Q 11/1038 408/1 R |

(Continued)

FOREIGN PATENT DOCUMENTS

| | | |
|---|---|---|
| CZ | 9112716.5 U1 | 3/1992 |
| DE | 252144 A1 | 12/1987 |
| DE | 19725345 C2 | 11/2001 |

(Continued)

*Primary Examiner* — Eric Keasel
(74) *Attorney, Agent, or Firm* — Richard M. Goldberg

(57) ABSTRACT

A coolant system for machine tools, includes a pump (12) for the coolant, at least one consumer (10), a pressure sensor (24) for detecting an actual pressure ($P_i$) in the coolant system, a feedback control device (22) acting upon the pump (12) for regulating the pressure in the coolant system to a target pressure ($P_s$), and a limiting valve (26) for limiting the pressure of the coolant supplied to the consumer, wherein in that the opening pressure ($P_{lim}$) of the limiting valve (26) is variable and the feedback control device (22) is adapted to adjust the opening pressure in accordance with the target pressure ($P_s$) such that it is always a certain amount larger than the target pressure.

3 Claims, 2 Drawing Sheets

(56) References Cited

U.S. PATENT DOCUMENTS 9,383,147 B2 * 7/2016 Kono .................. F28F 27/02
2012/0015587 A1 1/2012 Leishman et al.

FOREIGN PATENT DOCUMENTS

| DE | 102006052602 B4 | 5/2010 |
| DE | 102010017208 A1 | 12/2011 |

* cited by examiner

COOLANT SYSTEM FOR MACHINE TOOLS

BACKGROUND OF THE INVENTION

The invention relates to a coolant system for machine tools, comprising a pump for the coolant, at least one consumer, a pressure sensor for detecting an actual pressure in the coolant system, a feedback control device acting upon the pump for regulating the pressure in the coolant system to a target pressure, and a limiting valve for limiting the pressure of the coolant supplied to the consumer.

In machine tools there are typically used a plurality of different tools in one processing cycle. Each tool needs to be cooled by supplying a liquid coolant as long as the tool is in use. Since the demand for coolant is different from tool to tool, manufacturers of the tools specify for each tool a specific target pressure which the coolant system must provide.

In a coolant system of the type that has been described above, the pressure in the system is detected by means of a sensor, and the pump is regulated so as to maintain the prescribed target pressure. The limiting valve only serves as a safety valve and has a fixed opening pressure which is significantly larger than the highest possible target pressure. In this system, the pump may react upon changes of the demand for pressure only relatively slowly, so that, in specific cases, especially in cases where the demand for coolant decreases abruptly because, e.g., one of the consumers has been switched off, pressure surges may occur that are undesirable although they remain below the opening pressure of the safety valve.

SUMMARY OF THE INVENTION

It is an object of the invention to provide a coolant system which has little pumping losses and can nevertheless be quickly adapted to changes in the demand.

In order to achieve this object, according to the invention, the opening pressure of the limiting valve is variable and the feedback control device is adapted to adjust the opening pressure in accordance with the target pressure in such a manner that the opening pressure is always a certain amount higher than the target pressure.

Thus, according to the invention, the limiting valve serves not only as a mere safety valve but has also the function to suppress the undesired pressure surges when the demand for coolant decreases. In that case, it is accepted that, in order to suppress the pressure surges, a certain amount of coolant is drained via the limiting valve, so that the pump losses are slightly increased. Since, however, the phases in which the limiting valve opens are only very short and occur only sporadically, the increase in pumping losses is negligible.

In order to suppress the pressure surges as far as possible, it would be desirable, that the opening pressure of the limiting valve is only slightly higher than the target pressure. If, however, the pressure difference is too small, it may happen that the limiting valve will open more frequently, just because of the normal control fluctuations of the controller, so that increased pumping losses may occur. For this reason, in practice, the distance between the opening pressure and the target pressure should be adapted to the control fluctuations of the control loop that is formed by the pump, the pressure sensor and the controller.

Useful optional features of the invention are indicated in the dependent claims.

In one embodiment, the feedback control device may be configured such that it keeps the distance between the opening pressure and the target pressure constant. In another embodiment, this distance my be varied in proportion to the target pressure.

BRIEF DESCRIPTION OF THE DRAWINGS

An embodiment example will now be described in greater detail in conjunction with the drawings, wherein.

DETAILED DESCRIPTION

Figure 1:
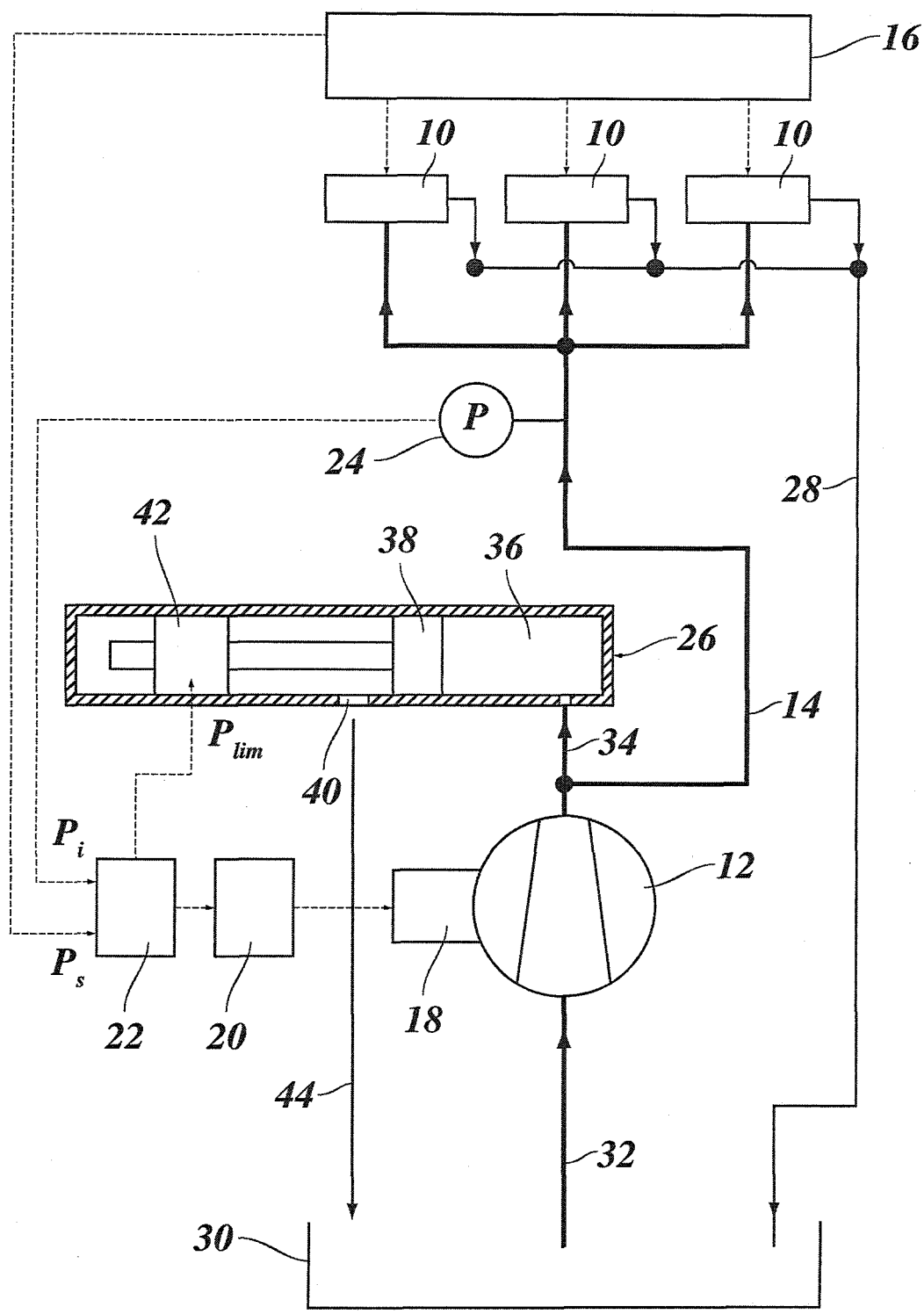
FIG. 1 shows a circuit diagram of a coolant system of a machine tool.

The coolant system that has been shown in the drawing comprises three consumers 10 that are supplied with liquid coolant from a pump 12. A discharge line 14 of the pump 12 branches to the three consumers 10 so that they are all supplied with coolant from the same pump 12.

Each consumer 10 is formed by a cooling arrangement for a specific tool of the machine tool. The tools differ in their sizes and constructions and consequently also in their demand for coolant. A control unit 16 of the machine tool controls the consumers 10 such that the cooling arrangement for a given tool is activated (e.g. by opening a valve that has not been shown here) at the very time when this tool is in use. When the machine tool is configured for the simultaneous use of a plurality of tools, a plurality of consumers may be activated simultaneously.

The pump 12 is driven by a motor 18 the rotary speed of which is controlled by means of frequency converter 20. The frequency of the frequency converter 20 is determined by a feedback control device 22 that receives a signal indicating the actual pressure $P_i$ in the discharge line from a pressure sensor 24 and receives, from the control unit 16, a signal indicating a target pressure $P_s$ that depends upon the current activity of the consumers.

Moreover, the feedback control device 22 controls a pressure limiting valve 26 such that the pressure in the discharge line 14 is limited to value that depends upon the target pressure. To that end, the limiting valve 26 receives, from the feedback control device 22, a signal that indicates the opening pressure $P_{lim}$ of the limiting valve.

The coolant that has been delivered to the tool by an active consumer is collected and, as has been symbolized by a recirculation line 28 in the drawing, is recirculated to a sump 30 from which the coolant may again be sucked-in by the pump 12 via a suction line 32.

A branch line 34 leads from the discharge line 14 of the pump to a pressure chamber 36 of the limiting valve 26. The pressure chamber 36 is delimited by a piston 38 and, consequently, has a variable value. Depending upon the position of the piston 38, a relief opening 40 of the limiting valve 26 is kept closed or opened to a smaller or larger extent. An actuator 42, e.g. a electro-pneumatic actuator, biases the piston 38 in closing direction (rightwards in the drawing) with a certain closing force that is determined by the feedback control device 22. When the pressure in the pressure chamber 36 exceeds the opening pressure $P_{lim}$, the force which the coolant exerts upon the piston 38 overcomes the closing force of the actuator 42, so that the piston moves leftwards and opens the relief opening 40 and, consequently, a portion of the coolant delivered by the pump 12 is returned to the sump 30 via the relief opening 40 and a bypass line 44. In this way, the pressure in the pressure chamber 36 and the discharge line 14 is limited.

The feedback control device 22 controls the rotary speed of the motor 18 and hence the displacement of the pump 12 such that the pressure in the discharge line 14 is kept close to the target pressure $P_s$ which is always a little smaller than the opening pressure $P_{lim}$ of the limiting valve. Then, the displacement of the pump is just sufficient for supplying the consumer 10 that is currently active with the specified target pressure.

In case of a tool change, the control unit 16 issues a command to deactivate the consumer 10 that has heretofore been active and to activate instead the consumer that belongs to the new tool. If necessary, the control device 16 will simultaneously increase or decrease the target pressure $P_s$. In this case, the feedback control device 22 commands the actuator 42 to adjust the opening pressure $P_{lim}$ accordingly.

When the new target pressure is smaller than the former target pressure, the feedback control device 22 causes a decrease of the rotary speed of the motor 18. Since, consequently, the displacement of the pump 12 decreases, the pressure in the pressure chamber 36 is reduced. This does however not cause the piston 38 to move rightwards, because, simultaneously, the opening pressure and hence the closing force is reduced as well. In this way, the actual pressure will rapidly decrease to the new target pressure. As the case may be, the closing force may even be reduced to such an extent that the piston 38 moves leftwards and preliminarily opens the relief opening 40 and accelerates the reduction of pressure.

When a tool change implies the use of a tool that requires a higher target pressure, the feedback control device 22 commands the actuator 42 to increase the opening pressure and the closing force. As a consequence, the piston 38 is moved rightwards and the volume of the pressure chamber 36 is reduced. In this way, if the pressure chamber 36 has sufficiently large dimension, it can be achieved that the consumer 10 will be supplied with a sufficient amount of coolant even in a transition phase in which the displacement of the pump has not yet reached the required value.

In a modified embodiment, the control unit 16 may issue the commands for switching the consumers 10 and for changing the target pressure with a certain time delay so that, for example, the feedback control device 22 is caused to "anticipate" a change of the displacement of the pump 12.

Figure 2:
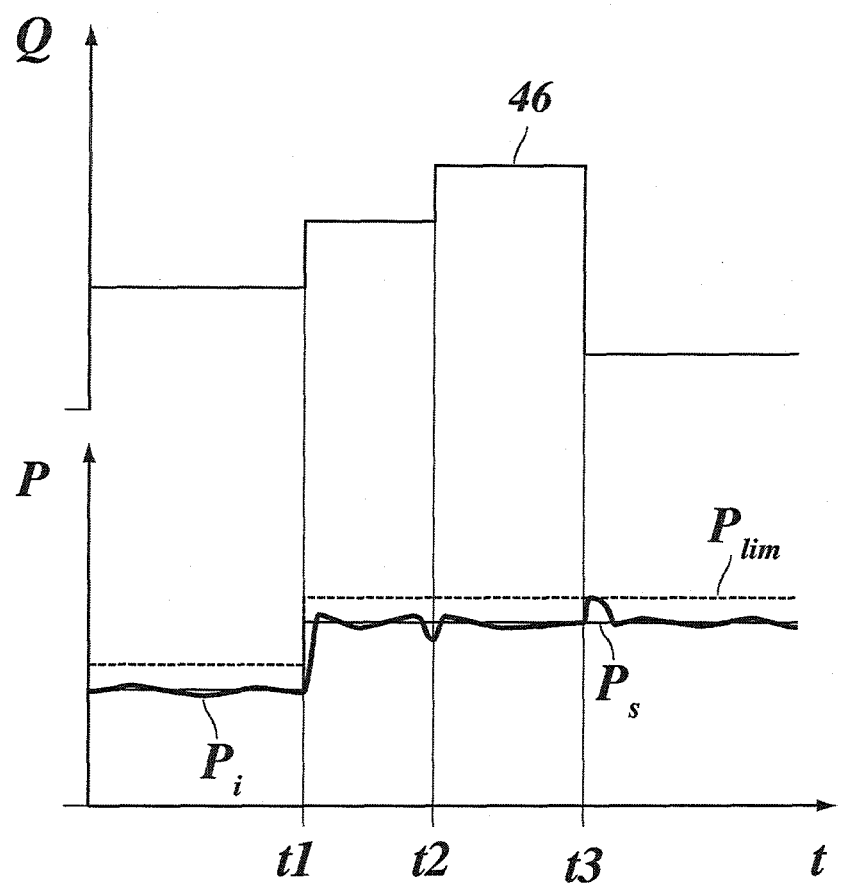
FIG. 2 is a time diagram explaining the function of the coolant system.

FIG. 2 is a time diagram illustrating the function of the coolant system.

A curve 46 in FIG. 2 indicates the time change of the coolant demand Q of the consumers 10 which results from the fact that, at times t1, t2 and t3, there is a switch from one consumer to another or a consumer is switched on or off. A thinner continuous line in the lower part FIG. 2 indicates the time dependency of the target pressure $P_s$ as determined by the control unit 16. At time t1, the target pressure increases. At the times t2 and t3, the target pressure remains constant although the coolant demand Q changes due to consumers being switched on and off, respectively. A curve that has been drawn in dashed lines indicates a corresponding change of the opening pressure $P_{lim}$. In the example that has been shown here, the distance between the target pressure $P_s$ and the opening pressure $P_{lim}$ is always constant, independent of the absolute height of the target pressure. In a modified embodiment, this distance could also be proportional to the absolute height of the target pressure $P_s$. Optionally, the distance might also be a more complex function of the target pressure.

A curve drawn in bold lines in FIG. 2 indicates the time dependency of the actual pressure $P_i$. It can be seen, that, due to the control properties of the system, the actual pressure $P_i$ always oscillates somewhat about the respective target pressure $P_s$. However, the distance between $P_{lim}$ and $P_s$ has been selected such that the opening pressure $P_{lim}$ is not reached during these fluctuations.

At time t1, the actual pressure $P_i$ increases in accordance with an increase of the target pressure $P_s$. At time t2, there is a temporary drop in the actual pressure because another consumer is switched on. This drop is however counterbalanced immediately by a corresponding increase of the rotary speed of the pump.

At time t3, the demand for coolant decreases abruptly, because consumers have been switched off while the target pressure $P_s$ remains constant. Because the rotary speed of the motor 18 cannot decrease quickly enough, in this situation, the opening pressure $P_{lim}$ is exceeded for a short time interval, so that the pressure limiting valve 26 opens. In this way, the pressure surge is limited to the opening pressure $P_{lim}$. While the rotary speed of the pump decreases further, the actual pressure decreases, so that the limiting valve closes again and the pressure settles again so as to oscillate about the target pressure $P_s$.

What is claimed is:

1. A coolant system for machine tools having at least one consumer, comprising:
    a pump for coolant,
    a pressure sensor for detecting an actual pressure ($P_i$) in the coolant system,
    a feedback control device acting upon the pump for regulating the pressure in the coolant system to a target pressure ($P_s$), and
    a limiting valve for limiting the pressure of the coolant supplied to the at least one consumer,
    wherein an opening pressure ($P_{lim}$) of the limiting valve is variable and the feedback control device is adapted to adjust the opening pressure in accordance with the target pressure ($P_s$) such that the opening pressure ($P_{lim}$) is always a certain amount larger than the target pressure.

2. The coolant system according to claim 1, wherein the feedback control device is adapted to adjust the opening pressure ($P_{lim}$) to a value that has a constant distance from the target pressure ($P_s$).

3. The coolant system according to claim 1, wherein the feedback control device is adapted to adjust the opening pressure ($P_{lim}$) to a value that is proportional to a respective target pressure ($P_s$).

* * * * *